US011057329B2

(12) United States Patent
Mou

(10) Patent No.: US 11,057,329 B2
(45) Date of Patent: Jul. 6, 2021

(54) MESSAGE RECORD COMBINATION AND DISPLAY METHOD AND TERMINAL DEVICE

(71) Applicant: Huawei Technologies Co., Ltd., Shenzhen (CN)

(72) Inventor: Lei Mou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/480,971

(22) PCT Filed: Jan. 25, 2017

(86) PCT No.: PCT/CN2017/072682
§ 371 (c)(1),
(2) Date: Jul. 25, 2019

(87) PCT Pub. No.: WO2018/137207
PCT Pub. Date: Aug. 2, 2018

(65) Prior Publication Data

US 2020/0007483 A1 Jan. 2, 2020

(51) Int. Cl.
*G06F 15/16* (2006.01)
*H04L 12/58* (2006.01)
(Continued)

(52) U.S. Cl.
CPC ................ *H04L 51/16* (2013.01); *G06F 7/08* (2013.01); *G06F 16/904* (2019.01); *H04L 51/04* (2013.01)

(58) Field of Classification Search
CPC ....... H04L 51/16; H04L 51/04; G06F 16/904; G06F 7/08; G06F 40/103; G06F 16/00
See application file for complete search history.

(56) References Cited

U.S. PATENT DOCUMENTS 8,301,169 B2 10/2012 Hung et al.
2001/0029455 A1 10/2001 Chin et al.
(Continued)

FOREIGN PATENT DOCUMENTS

CN 101047520 A 10/2007
CN 101416207 A 4/2009
(Continued)

OTHER PUBLICATIONS

Machine Translation and Abstract of Chinese Publication No. CN103167172, Jun. 19, 2013, 19 pages.
(Continued)

*Primary Examiner* — John B Walsh
(74) *Attorney, Agent, or Firm* — Conley Rose, P.C.

(57) ABSTRACT

A first terminal device obtains a message record of the first terminal device, and obtains a message record of a second terminal device, where the message record of the first terminal device includes message content of a first message and a causal time of the first message, and the message record of the second terminal device includes message content of a second message and a causal time of the second message. The first terminal device sorts the message content of the first message and the message content of the second message based on the causal time of the first message and the causal time of the second message, and displays the message content of the first message and the message content of the second message in sequence.

20 Claims, 11 Drawing Sheets

First terminal device 11

Server 13

Second terminal device 12

(51) Int. Cl.

| | |
|---|---|
| ***G06F 16/904*** | (2019.01) |
| ***G06F 7/08*** | (2006.01) |

(56) References Cited

U.S. PATENT DOCUMENTS

| | | | |
|---|---|---|---|
| 2005/0193345 A1 | 9/2005 | Klassen et al. | |
| 2007/0185961 A1 | 8/2007 | Perlow et al. | |
| 2009/0055487 A1* | 2/2009 | Moraes | G06Q 10/107 709/206 |
| 2011/0081920 A1 | 4/2011 | Hung et al. | |
| 2012/0215870 A1* | 8/2012 | Zhou | H04L 51/063 709/206 |
| 2013/0226943 A1 | 8/2013 | Zheng et al. | |
| 2015/0149561 A1 | 5/2015 | Bell et al. | |

FOREIGN PATENT DOCUMENTS

| | | | |
|---|---|---|---|
| CN | 102035756 | A | 4/2011 |
| CN | 102447778 | A | 5/2012 |
| CN | 103139259 | A | 6/2013 |
| CN | 103167172 | A | 6/2013 |
| CN | 103377221 | A | 10/2013 |
| CN | 103812755 | A | 5/2014 |
| CN | 105471716 | A | 4/2016 |
| EP | 2309688 | A1 | 4/2011 |
| EP | 2942910 | A1 | 11/2015 |
| JP | 2014106592 | A | 6/2014 |
| JP | 2014198168 | A | 10/2014 |
| JP | 2014198169 | A | 10/2014 |
| JP | 2016212878 | A | 12/2016 |
| WO | 2016122713 | A1 | 8/2016 |

OTHER PUBLICATIONS

Foreign Communication From a Counterpart Application, PCT Application No. PCT/CN2017/072682, English Translation of International Search Report dated May 2, 2017, 2 pages.

Foreign Communication From a Counterpart Application, PCT Application No. PCT/CN2017/072682, English Translation of Written Opinion dated May 2, 2017, 6 pages.

Foreign Communication From a Counterpart Application, European Application No. 17894045.8, Extended European Search Report dated Nov. 15, 2019, 7 pages.

Machine Translation and Abstract of Chinese Publication No. CN101047520, Oct. 3, 2007, 12 pages.

* cited by examiner

China Mobile

Chat

Xiao Hong 14:22

Xiao Ming 15:45

FIG. 7

MESSAGE RECORD COMBINATION AND DISPLAY METHOD AND TERMINAL DEVICE

CROSS-REFERENCE TO RELATED APPLICATIONS

This application is a National Stage of International Patent Application No. PCT/CN2017/072682, filed on Jan. 25, 2017, which is hereby incorporated by reference in its entirety.

TECHNICAL FIELD

Embodiments of the present invention relate to the communications field, and in particular, to a message record combination and display method and a terminal device.

BACKGROUND

Instant messaging (Instant Messaging, IM) is a real-time communications service that can allow a user to establish a private chat room on a network. As IM applications such as WeChat and Fetion are widely used, the user may install an IM application on a terminal device such as a mobile phone or a tablet computer (Pad), and use an installed IM application to perform chatting.

In the prior art, in a process in which the user uses an IM application to perform chatting, the terminal device stores, in a message record of the terminal device, both message content of a message generated in a chat and a display time of the message. The display time of the message is specifically as follows: If the message is a message that needs to be sent by the terminal device, the display time is a local time of the terminal device. If the message is a message received by the terminal device, the display time is obtained through calculation based on a coordinated universal time (Universal Time Coordinated, UTC) at which a server sends the message and a time zone in which the terminal device is located. In addition, with popularization of the terminal device such as the mobile phone or the Pad, chatting performed by the user with a same account on different terminal devices is popular. In this case, message records generated in chats performed by the user are separately stored in different terminal devices. If the user needs to display message records on different terminal devices together, the user usually combines the message records of the different terminal devices, and displays combined message records in sequence after the terminal device sorts the message records based on display times of messages stored in the message records of the terminal devices.

It can be learned from the foregoing description that a display time of a message is determined by a local time of a terminal device or a time zone in which the terminal device is located. When the user needs to combine message records of different terminal devices, if local times of the terminal devices whose message records need to be combined are inconsistent, or if time zones in which the terminal devices whose message records need to be combined are located are inconsistent, combined message records cannot be correctly sorted in a message sending and receiving sequence, and finally the message records are displayed in disorder.

SUMMARY

Embodiments of the present invention provide a message record combination and display method and a terminal device, to resolve a problem that combined message records are displayed in disorder when message records of different terminal devices are combined.

To resolve the foregoing technique problem, the embodiments of the present invention provide the following technical solutions.

According to a first aspect of the embodiments of the present invention, a message record combination and display method is provided, including:

obtaining, by a first terminal device, a message record of the first terminal device, and obtaining a message record of a second terminal device, where the message record of the first terminal device includes message content of a first message and a casual time of the first message, and the message record of the second terminal device includes message content of a second message and a casual time of the second message; sorting the message content of the first message and the message content of the second message based on the casual time of the first message and the casual time of the second message; and displaying the message content of the first message and the message content of the second message in sequence.

According to the message record combination and display method provided in this embodiment of the present invention, the first terminal device sorts the message content of the first message and the message content of the second message based on the obtained casual time of the first message and the obtained casual time of the second message, and displays the message content of the first message and the message content of the second message in sequence. In this way, when message records of different terminal devices need to be combined, because a terminal device combines the message records based on casual times of messages rather than display times of the messages, a problem that combined message records cannot be correctly sorted and displayed in a message sending and receiving sequence because a display time of a message is affected by a factor such as a local time of a terminal device or a time zone in which the terminal device is located does not occur.

With reference to the first aspect, in a possible implementation, the casual time of the first message is a coordinated universal time at which the first message is transmitted, and the casual time of the second message is a coordinated universal time at which the second message is transmitted.

With reference to the first aspect or the foregoing possible implementation, in another possible implementation, the first message is a message that needs to be sent by the first terminal device, and the message record combination and display method may further include: recording, by the first terminal device, the casual time of the first message, where the casual time of the first message is determined based on an initial time, first duration, and second duration. The initial time is a coordinated universal time at which the first terminal device successfully logs in to an IM application. After receiving a login request sent by the first terminal device, a server may add the initial time to a login response to notify the first terminal device of the initial time. The first duration is duration from a start moment of the first terminal device to the moment at which the first terminal device successfully logs in to the IM application, the start moment is a moment at which the first terminal device is powered on, and the second duration is duration from the start moment of the first terminal device to a moment at which the first terminal device detects that the first message needs to be sent. That the first terminal device determines the casual time of the first message based on the initial time, the first duration, and the second duration may be specifically as follows: the casual time of the first message=the initial time+(the second duration−the first duration).

With reference to the first aspect or the foregoing possible implementation, in another possible implementation, the first message is a message that needs to be sent by the first terminal device, and the message record combination and display method may further include: sending, by the first terminal device, the first message to a server, and receiving the casual time that is of the first message and that is sent by the server, where the casual time of the first message is a coordinated universal time at which the server receives the first message.

With reference to the first aspect or the foregoing possible implementation, in another possible implementation, the first message is a message received by the first terminal device, and the message record combination and display method may further include: receiving, by the first terminal device, the casual time that is of the first message and that is sent by a server, where the casual time of the first message is a coordinated universal time at which the server sends the first message to the first terminal device.

With reference to the first aspect or the foregoing possible implementations, in another possible implementation, the message record of the first terminal device further includes a display time of the first message. To ensure that display times in combined message records are increased in sequence, and to reduce power consumption of the first terminal device, the message record combination and display method provided in this embodiment of the present invention may further include: obtaining, by the first terminal device, a display time of a third message; and when determining that a difference between the display time of the first message and the display time of the third message is greater than a preset threshold, displaying the display time of the first message. The third message is a message that is displayed before the first message and whose display time is displayed, and the display time of the third message is included in the message record of the first terminal device or included in the message record of the second terminal device.

With reference to the first aspect or the foregoing possible implementations, in another possible implementation, the message record of the second terminal device further includes a display time of the second message. To ensure that the display times in the combined message records are increased in sequence, and to reduce power consumption of the first terminal device, the message record combination and display method provided in this embodiment of the present invention may further include: obtaining, by the first terminal device, a display time of a fourth message; and when determining that a difference between the display time of the second message and the display time of the fourth message is greater than a preset threshold, displaying the display time of the second message. The fourth message is a message that is displayed before the second message and whose display time is displayed, and the display time of the fourth message is included in the message record of the first terminal device or included in the message record of the second terminal device.

According to a second aspect of the embodiments of the present invention, a terminal device is provided, where the terminal device includes a processor and a display. The processor is configured to: obtain a message record of the terminal device; obtain a message record of a second terminal device, where the message record of the terminal device includes message content of a first message and a casual time of the first message, and the message record of the second terminal device includes message content of a second message and a casual time of the second message; and sort the message content of the first message and the message content of the second message based on the casual time of the first message and the casual time of the second message. The display is configured to display the message content of the first message and the message content of the second message based on a sequence obtained after the processor performs sorting.

With reference to the second aspect, in a possible implementation, the casual time of the first message is a coordinated universal time at which the first message is transmitted, and the casual time of the second message is a coordinated universal time at which the second message is transmitted.

With reference to the second aspect or the foregoing possible implementation, in another possible implementation, the first message is a message that needs to be sent by the terminal device, and the terminal device further includes a memory. The memory is configured to record the casual time of the first message, where the casual time of the first message is determined based on an initial time, first duration, and second duration. The initial time is a coordinated universal time at which the terminal device successfully logs in to an IM application, the first duration is duration from a start moment of the terminal device to the moment at which the terminal device successfully logs in to the IM application, the start moment is a moment at which the terminal device is powered on, and the second duration is duration from the start moment of the terminal device to a moment at which the terminal device detects that the first message needs to be sent.

With reference to the second aspect or the foregoing possible implementation, in another possible implementation, the first message is a message that needs to be sent by the terminal device, and the terminal device further includes a radio frequency (Radio Frequency, RF) circuit. The RF circuit is configured to send the first message to a server, and receive the casual time that is of the first message and that is sent by the server, where the casual time of the first message is a coordinated universal time at which the server receives the first message.

With reference to the second aspect or the foregoing possible implementation, in another possible implementation, the first message is a message received by the terminal device, and the terminal device further includes an RF circuit. The RF circuit is configured to receive the casual time that is of the first message and that is sent by a server, where the casual time of the first message is a coordinated universal time at which the server sends the first message to the terminal device.

With reference to the second aspect or the foregoing possible implementations, in another possible implementation, the message record of the terminal device further includes a display time of the first message. The processor is further configured to: obtain a display time of a third message, where the third message is a message that is displayed before the first message and whose display time is displayed, and the display time of the third message is included in the message record of the terminal device or included in the message record of the second terminal device; and determine a difference between the display time of the first message and the display time of the third message. The display is further configured to: when the processor determines that the difference between the display time of the first message and the display time of the third message is greater than a preset threshold, display the display time of the first message.

With reference to the second aspect or the foregoing possible implementations, in another possible implementation, the message record of the second terminal device further includes a display time of the second message. The processor is further configured to: obtain a display time of a fourth message, where the fourth message is a message that is displayed before the second message and whose display time is displayed, and the display time of the fourth message is included in the message record of the terminal device or included in the message record of the second terminal device; and determine a difference between the display time of the second message and the display time of the fourth message. The display is further configured to: when the processor determines that the difference between the display time of the second message and the display time of the fourth message is greater than a preset threshold, display the display time of the second message.

According to a third aspect of the embodiments of the present invention, a terminal device is provided, where the terminal device includes an obtaining unit; a sorting unit; and a display unit. The obtaining unit is configured to: obtain a message record of the terminal device; and obtain a message record of a second terminal device, where the message record of the terminal device includes message content of a first message and a casual time of the first message, and the message record of the second terminal device includes message content of a second message and a casual time of the second message. The sorting unit is configured to sort, based on the casual time of the first message and the casual time of the second message that are obtained by the obtaining unit, the message content of the first message and the message content of the second message that are obtained by the obtaining unit. The display unit is configured to display the message content of the first message and the message content of the second message based on a sequence obtained after the sorting unit performs sorting.

With reference to the third aspect, in a possible implementation, the casual time of the first message is a coordinated universal time at which the first message is transmitted, and the casual time of the second message is a coordinated universal time at which the second message is transmitted.

With reference to the third aspect or the foregoing possible implementation, in another possible implementation, the first message is a message that needs to be sent by the terminal device, and the terminal device further includes a storage unit. The storage unit is configured to record the casual time of the first message, where the casual time of the first message is determined based on an initial time, first duration, and second duration. The initial time is a coordinated universal time at which the terminal device successfully logs in to an IM application, the first duration is duration from a start moment of the terminal device to the moment at which the terminal device successfully logs in to the IM application, the start moment is a moment at which the terminal device is powered on, and the second duration is duration from the start moment of the terminal device to a moment at which the terminal device detects that the first message needs to be sent.

With reference to the third aspect or the foregoing possible implementation, in another possible implementation, the first message is a message that needs to be sent by the terminal device, and the terminal device further includes a sending unit and a receiving unit. The sending unit is configured to send the first message to a server. The receiving unit is configured to receive the casual time that is of the first message and that is sent by the server, where the casual time of the first message is a coordinated universal time at which the server receives the first message.

With reference to the third aspect or the foregoing possible implementation, in another possible implementation, the first message is a message received by the terminal device, and the terminal device further includes a receiving unit. The receiving unit is configured to receive the casual time that is of the first message and that is sent by a server, where the casual time of the first message is a coordinated universal time at which the server sends the first message to the terminal device.

With reference to the third aspect or the foregoing possible implementations, in another possible implementation, the message record of the terminal device that is obtained by the obtaining unit further includes a display time of the first message, and the terminal device further includes a determining unit. The obtaining unit is further configured to obtain a display time of a third message, where the third message is a message that is displayed before the first message and whose display time is displayed, and the display time of the third message is included in the message record of the terminal device or included in the message record of the second terminal device. The determining unit is configured to determine a difference between the display time of the first message and the display time that is of the third message and that is obtained by the obtaining unit. The display unit is further configured to: when the determining unit determines that the difference between the display time of the first message and the display time of the third message is greater than a preset threshold, display the display time of the first message.

With reference to the third aspect or the foregoing possible implementations, in another possible implementation, the message record of the second terminal device further includes a display time of the second message. The obtaining unit is further configured to obtain a display time of a fourth message, where the fourth message is a message that is displayed before the second message and whose display time is displayed, and the display time of the fourth message is included in the message record of the terminal device or included in the message record of the second terminal device. The determining unit is further configured to determine a difference between the display time of the second message and the display time that is of the fourth message and that is obtained by the obtaining unit. The display unit is further configured to: when the determining unit determines that the difference between the display time of the second message and the display time of the fourth message is greater than a preset threshold, display the display time of second message.

According to a fourth aspect of the embodiments of the present invention, a computer storage medium is provided, configured to store a computer software instruction used by the foregoing first terminal device, where the computer software instruction includes a program designed to perform the foregoing message record combination and display method.

BRIEF DESCRIPTION OF DRAWINGS

FIG. 7 is a schematic flowchart of another message record combination and display method according to an embodiment of the present invention;

DESCRIPTION OF EMBODIMENTS

To resolve a problem that combined message records are displayed in disorder when message records of different terminal devices are combined, embodiments of the present invention provide a message record combination and display method. A first terminal device obtains a message record of the first terminal device, and obtains a message record of a second terminal device. The message record of the first terminal device includes message content of a first message and a casual time of the first message, and the message record of the second terminal device includes message content of a second message and a casual time of the second message. The first terminal device sorts the message content of the first message and the message content of the second message based on the casual time of the first message and the casual time of the second message, and displays the message content of the first message and the message content of the second message in sequence. In this way, when message records of different terminal devices need to be combined, because a casual time of a message is a coordinated universal time at which the message is transmitted, and the coordinated universal time is not affected by a factor such as a local time of a terminal device or a time zone in which the terminal device is located, the message records combined based on casual times of messages can be correctly sorted and displayed in a message sending and receiving sequence.

The following describes implementations of the embodiments of the present invention in detail with reference to the accompanying drawings.

Figure 1:
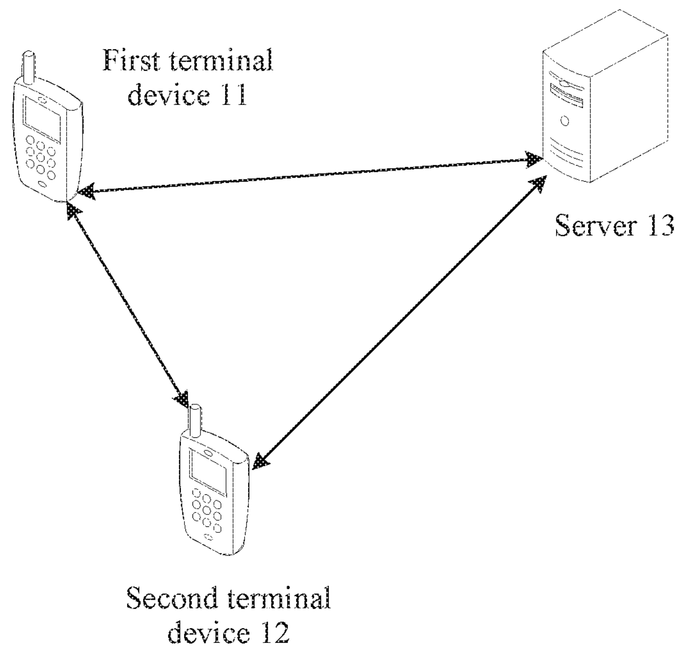
FIG. 1 is a simplified schematic diagram of a system architecture applicable to an embodiment of the present invention according to an embodiment of the present invention.

FIG. 1 is a simplified schematic diagram of a system architecture applicable to an embodiment of the present invention. As shown in FIG. 1, the system architecture may include a first terminal device 11, a second terminal device 12, and a server 13.

An IM application is installed on the first terminal device 11. If a user needs to use the installed IM application to perform chatting, after the user successfully logs in to the IM application, a message is transmitted between the first terminal device 11 used by the user and another user terminal. The first terminal device 11 may store, in a message record, a casual time, message content, and a display time of the message that is transmitted between the first terminal device 11 used by the user and another user terminal. The display time of the message may be determined by the first terminal device 11 based on a local time of the first terminal device 11 or a time zone in which the first terminal device 11 is located. The local time of the first terminal device 11 and the time zone in which the first terminal device 11 is located may be obtained by the first terminal device 11 through interaction with the server 13.

The IM application is also installed on the second terminal device 12. The user may log in to the IM application on the second terminal device 12 by using a same account. After the login succeeds, a message is transmitted between the second terminal device 12 used by the user and the another user terminal. The second terminal device may store, in a message record, a casual time, message content, and a display time of the message that is transmitted between the second terminal device 12 used by the user and the another user terminal.

When the message record of the first terminal device 11 and the message record of the second terminal device 12 need to be combined, for example, the message record of the second terminal device 12 needs to be combined into the first terminal device 11, the first terminal device 11 may obtain the message record of the second terminal device 12 in a manner such as Wireless Fidelity (Wireless Fidelity, Wi-Fi) or Bluetooth.

The server 13 is configured to forward the message transmitted between the first terminal device 11 and the another user terminal and the message transmitted between the second terminal device 12 and the another user terminal.

In a specific implementation, the first terminal device 11 and the second terminal device 12 may be a desktop, laptop, or tablet computer, a handheld computer, a mobile phone, a notebook computer, an ultra-mobile personal computer (Ultra-mobile Personal Computer, UMPC), a netbook, a cellular phone, a personal digital assistant (Personal Digital Assistant, PDA), a dedicated media player, a consumption electronic device, a wearable device, a smartwatch, smart glasses, or the like.

In an embodiment of the present invention, an example in which the first terminal device 11 and the second terminal device 12 are mobile phones is used for description. The following describes components of the mobile phone in detail with reference to an accompanying drawing.

Figure 2:
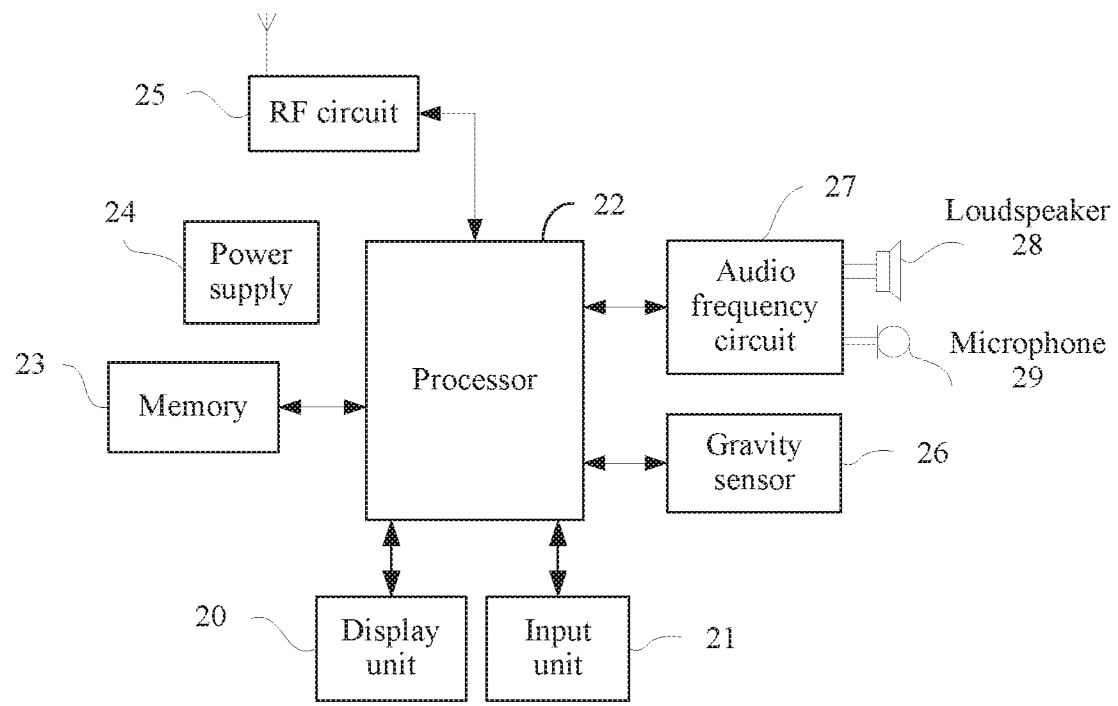
FIG. 2 is a schematic structural diagram of a terminal device according to an embodiment of the present invention.

As shown in FIG. 2, a mobile phone may include components such as a display unit 20, an input unit 21, a processor 22, a memory 23, a power supply 24, an RF circuit 25, a gravity sensor 26, an audio frequency circuit 27, a loudspeaker 28, and a microphone 29. These components may be connected by using a bus, or may be directly connected. A person skilled in the art may understand that a structure of the mobile phone shown in FIG. 2 constitutes no limitation on the mobile phone, and the mobile phone may include more components than those shown in the figure, or TO combine some components, or have different component arrangements.

The display unit 20 is operably connected to the processor 22, and is configured to receive and display a processing result returned by the processor 22. For example, the display unit 20 may be configured to display an image captured by using a camera, and various menus of the mobile phone. The display unit 20 is usually configured with a graphical user interface (Graphical User Interface, GUI), and the GUI is configured to provide an easy-to-use interface between a user and an operating system running on the mobile phone. In this embodiment of the present invention, the display unit 20 is configured to display message records combined based on casual times of messages.

The input unit 21 may be a single-point or multipoint input unit. The input unit 21 is operably connected to the processor 22, and is configured to receive an input operation of the user. The input unit 21 may be a touchpad or a touchscreen that is disposed above or in front of the display unit 20. The touchpad or the touchscreen may collect a touch operation performed by the user on or near the touchpad or the touchscreen (for example, an operation performed by the user on the touchscreen or near the touchscreen by using any proper object or accessory such as a finger or a stylus), and drive a corresponding connection apparatus based on a preset program. For example, the touchpad or the touchscreen may be implemented based on a sensing technology such as capacitance sensing, resistance sensing, surface acoustic wave sensing, pressure sensing, or light sensing. The touchpad or the touchscreen may be integrated with the display unit 20, or may be an independent component. In this embodiment of the present invention, the input unit 21 is configured to receive a chat input operation of the user.

The processor 22 is a control center of the mobile phone, connects various parts of the entire mobile phone by using various interfaces and lines, and performs various functions of the mobile phone and data processing by running or executing a software program and/or a module that are/is stored in the memory 23 and by invoking data stored in the memory 23, to perform overall monitoring on the mobile phone. In specific implementation, in an embodiment, the processor 22 may include one or more processing units, and an application processor and a modem processor may be integrated into the processor 22. The application processor mainly processes an operating system, a user interface, an application program, and the like, and the modem processor mainly processes wireless communication. It may be understood that the modem processor may alternatively be not integrated into the processor 22. In this embodiment of the present invention, the processor 22 is configured to determine a casual time and a display time of a message, and obtain a message record of the mobile phone, and is further configured to combine message records of different mobile phones, and sort combined message records.

The memory 23 may be configured to store the data, the software program, and the module, and may be a volatile memory (Volatile Memory) such as a random access memory (Random-Access Memory, RAM); a non-volatile memory (Non-volatile Memory) such as a read-only memory (Read-Only Memory, ROM), a flash memory (Flash Memory), or a hard disk drive (Hard Disk Drive, HDD), or a solid-state drive (Solid-State Drive, SSD); or a combination of the foregoing types of memories. Alternatively, the memory 23 may be a removable storage medium such as a secure digital (Secure Digital, SD) memory card. Specifically, the memory 23 may store program code, and the program code is used to enable the processor 22 to perform, by executing the program code, the message combination and display method provided in the embodiments of the present invention. In this embodiment of the present invention, the memory 23 may be configured to store a message record. The message record may include a casual time of the message, a display time of the message, message content of the message, and the like.

The power supply 24 may be a battery, and is logically connected to the processor 22 by using a power supply management system, to implement functions such as charging and discharging management and power consumption management by using the power supply management system.

The RF circuit 25 may be configured to: receive or send a signal in an information receiving and sending process or a call process, and in particular, send received information to the processor 22 for processing, and send a signal generated by the processor 22. The RF circuit usually includes but is not limited to an antenna, at least one amplifier, a transceiver, a coupler, a low noise amplifier (Low Noise Amplifier, LNA), a duplexes, and the like. In addition, the RF circuit 25 may further communicate with a network and another device through wireless communication. In this embodiment of the present invention, the RF circuit 25 may communicate with a server, to transmit a historical chat record of chatting with another user terminal, obtain a coordinated universal time, and the like.

The gravity sensor (Gravity Sensor) 26 may detect acceleration values in all directions (generally, three axes) of the mobile phone, may detect a value and a direction of gravity in a static mode, and may be applied to an application used for identifying a mobile phone posture (for example, switching between landscape and portrait modes, a related game, or magnetometer posture calibration), a vibration identification-related function (for example, a pedometer or a stroke), and the like. It should be noted that the mobile phone may further include other sensors such as a pressure sensor, an optical sensor, a gyroscope, a barometer, a hygrometer, a thermometer, and an infrared sensor. Details are not described herein.

The audio frequency circuit 27, the loudspeaker 28, and the microphone 29 may provide an audio frequency interface between the user and the mobile phone. The audio frequency circuit 27 may transmit, to the loudspeaker 28, an electrical signal converted from received audio frequency data, and the loudspeaker 28 converts the electrical signal into a sound signal for output. In addition, the microphone 29 converts a collected sound signal into an electrical signal, and the audio frequency circuit 27 receives the electrical signal, converts the electrical signal into audio frequency data, and outputs the audio frequency data to the RF circuit 25 to send the audio frequency data to, for example, another mobile phone, or outputs the audio frequency data to the processor 22 for further processing.

In addition, an operating system runs above the foregoing components. An application program such as an IM application may be installed and run on the operating system. In addition, although not shown, the mobile phone may further include components such as a Wi-Fi module, a Bluetooth module, and a camera. The Wi-Fi module may be a module including a Wi-Fi chip and a driver of the Wi-Fi chip. The Wi-Fi chip has a capability of running a wireless Internet standard protocol. The Bluetooth module is a printed circuit board assembly (Printed Circuit Board Assembly, PCBA)

into which a Bluetooth function is integrated, and is used for short-distance wireless communication.

The following describes in detail a message record combination and display method provided in the embodiments of the present invention with reference to the accompanying drawings.

It should be noted that the coordinated universal time in the embodiments of the present invention may be further referred to as a world unified time, a world standard time, or an international coordinated time.

In some embodiments of the present invention, when a user performs chatting on different terminal devices (for example, a first terminal device and a second terminal device) by using a same account, if the user needs to combine and display message records of the different terminal devices, for example, the user needs to combine a message record of the second terminal device into the first terminal device and display combined message records, the user may combine and display the message records by using the message record combination and display method provided in the embodiments of the present invention. The following performs description by using the first terminal device and the second terminal device as an example.

A processor of the first terminal device may obtain a message record stored in the first terminal device, and obtain a message record of the second terminal device by using a Wi-Fi module or a Bluetooth module.

The message record of the first terminal device includes message content of a first message and a casual time of the first message. The first message is a message generated when the user performs chatting by using the first terminal device. The casual time of the first message is a coordinated universal time at which the first message is transmitted. The message record of the second terminal device includes message content of a second message and a casual time of the second message. The second message is a message generated when the user performs chatting by using the second terminal device. The casual time of the second message is a coordinated universal time at which the second message is transmitted.

In some embodiments, the processor of the first terminal device may directly obtain, from the second terminal device by using the module or the Bluetooth module, a historical chat record generated when the user performs chatting by using the second terminal device.

For example, the first terminal device is a mobile phone 1, the second terminal device is a mobile phone 2, and a distance between the mobile phone 1 and the mobile phone 2 is relatively short. The user needs to combine a WeChat historical chat record of the mobile phone 2 into the mobile phone 1. A processor of the mobile phone 1 may obtain a WeChat message record of the mobile phone 2 by using a Wi-Fi module or a Bluetooth module. For example, the user may connect the mobile phone 1 and the mobile phone 2 to a same Wi-Fi network, and enable a historical chat record migration function in WeChat of the mobile phone 2, to generate a quick response code. The user may log in to WeChat of the mobile phone 1 by using a same account, and scan the quick response code. The Wi-Fi module of the mobile phone 1 may receive the WeChat historical chat record transmitted by a Wi-Fi module of the mobile phone 2. For example, the user may enable Bluetooth functions of the mobile phone 1 and the mobile phone 2. The Bluetooth module of the mobile phone 1 and the Bluetooth module of the mobile phone 2 may perform search, and establish a connection channel after finding each other. In this way, the user may find the WeChat historical chat record in the mobile phone 2, and choose to send the WeChat historical chat record to the Bluetooth module of the mobile phone 1 through Bluetooth. The Bluetooth module of the mobile phone 1 may receive the WeChat historical chat record sent by the Bluetooth module of the mobile phone 2.

In some embodiments, if the second terminal device backs up a historical chat record onto a server, the processor of the first terminal device may further obtain, from the server, a historical chat record generated when the user performs chatting by using the second terminal device. For example, the first terminal device is a mobile phone 1, the second terminal device is a mobile phone 2, and both the mobile phone 1 and the mobile phone 2 access a network. When the user needs to combine a WeChat historical chat record in the mobile phone 2 into the mobile phone 1, the user may enable a function of uploading a message record in WeChat of the mobile phone 2, and the mobile phone 2 may upload the historical chat record to the server. The user may log in to WeChat of the mobile phone 1 by using a same account, and enable a function of downloading a message record. In this way, a processor of the mobile phone 1 may obtain the WeChat historical chart record of the mobile phone 2.

For example, the first terminal device is a mobile phone 1, and the second terminal device is a mobile phone 2. The user needs to combine a message record of the mobile phone 2 into the mobile phone 1, and a processor of the mobile phone 1 obtains a message record stored in the mobile phone 1. As shown in Table 1, the message record of the mobile phone 1 includes message content and a casual time of a message a. The message a is a message sent by the user by using the mobile phone 1. The processor of the mobile phone 1 obtains the message record of the mobile phone 2 by using a Wi-Fi module or a Bluetooth module. As shown in Table 2, the message record of the mobile phone 2 includes message content and a casual time of a message c. The message c is a message sent by the user by using the mobile phone 2.

TABLE 1

| | Message content | Casual time | Display time |
|---|---|---|---|
| Message a | Hello | 9:20 am | 10:20 am |

TABLE 2

| | Message content | Casual time | Display time |
|---|---|---|---|
| Message c | Hello? | 9:50 am | 10:05 am |

After obtaining the message record of the first terminal device and the message record of the second terminal device, the processor of the first terminal device may sort the message content of the first message and the message content of the second message based on the casual time of the first message and the casual time of the second message.

A display of the first terminal device may display the message content of the first message and the message content of the second message in sequence.

Figure 3:
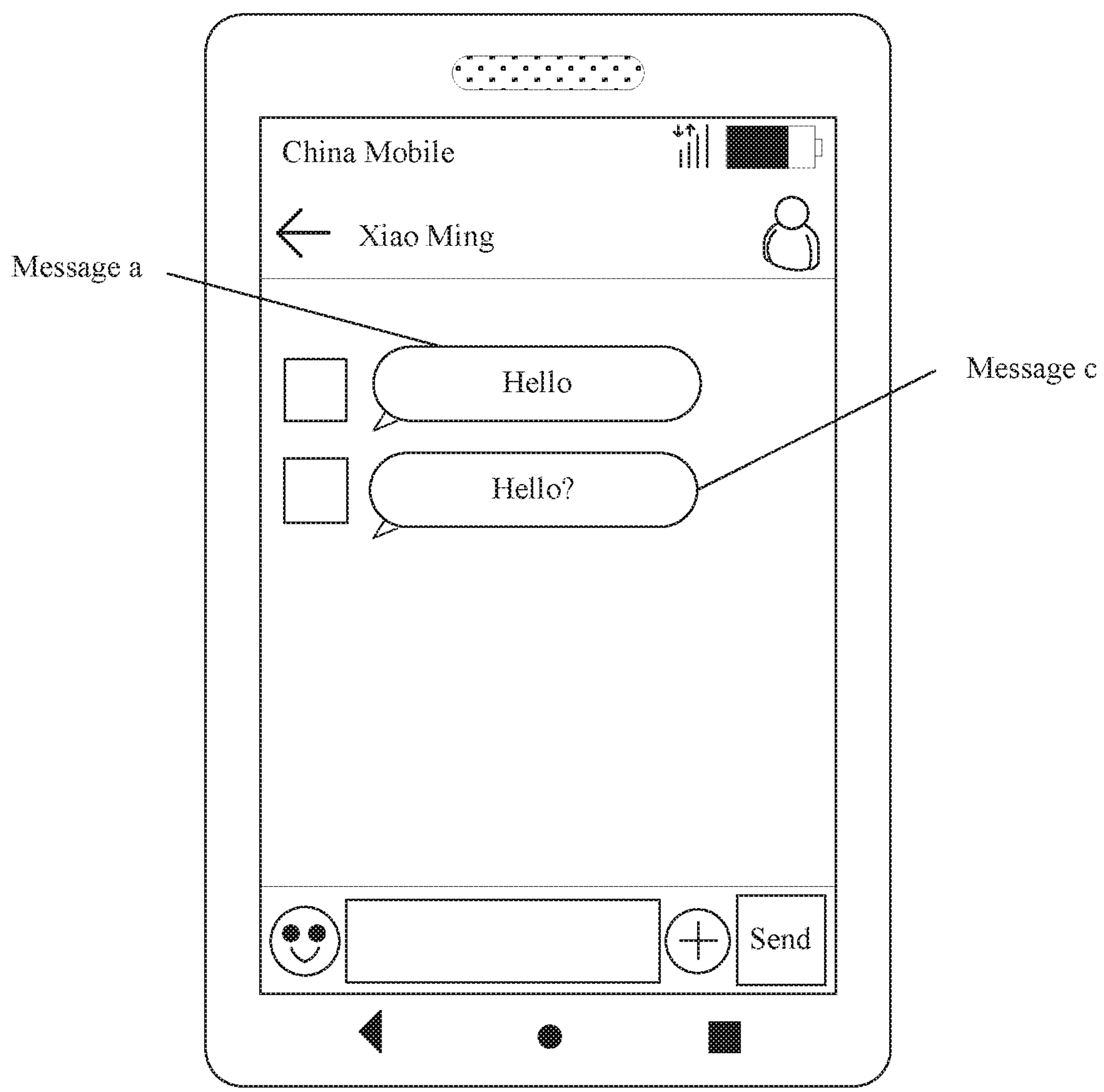
FIG. 3 is a schematic flowchart of a message record combination and display method according to an embodiment of the present invention.

Description is performed with reference to Table 1, Table 2, and FIG. 3. FIG. 3 is a schematic diagram of message content in combined message records displayed on a display of a mobile phone 1. A correct sorting result of the message content in the combined message records is as follows: message content of a message a, and message content of a message c. A processor of the mobile phone 1 may arrange the message content of the message c after the message content of the message a in ascending order of the casual time of the message a (the casual time of the message a is 9:20 am) and the casual time of the message c (the casual time of the message c is 9:50 am). The display of the mobile phone 1 displays the message content of the message a and the message content of the message c in sequence.

In some embodiments, a plurality of messages are separately stored in the mobile phone 1 and the mobile phone 2. As shown in Table 3, the message record of the mobile phone 1 includes message content and a casual time of a message a and message content and a casual time of a message h. The message a is a message sent by the user by using the mobile phone 1, and the message b is a message received by the user by using the mobile phone 1. As shown in Table 4, the message record of the mobile phone 2 includes message content and a casual time of a message c and message content and a casual time of a message d. Both the message c and the message d are messages sent by the user by using the mobile phone 2.

TABLE 3

| | Message content | Casual time | Display time |
|---|---|---|---|
| Message a | Hello | 9:20 am | 10:20 am |
| Message b | At home | 14:45 pm | 15:45 pm |

TABLE 4

| | Message content | Casual time | Display time |
|---|---|---|---|
| Message c | Hello? | 9:50 am | 10:05 am |
| Message d | Where are you? | 9:52 am | 10:07 am |

Figure 4:
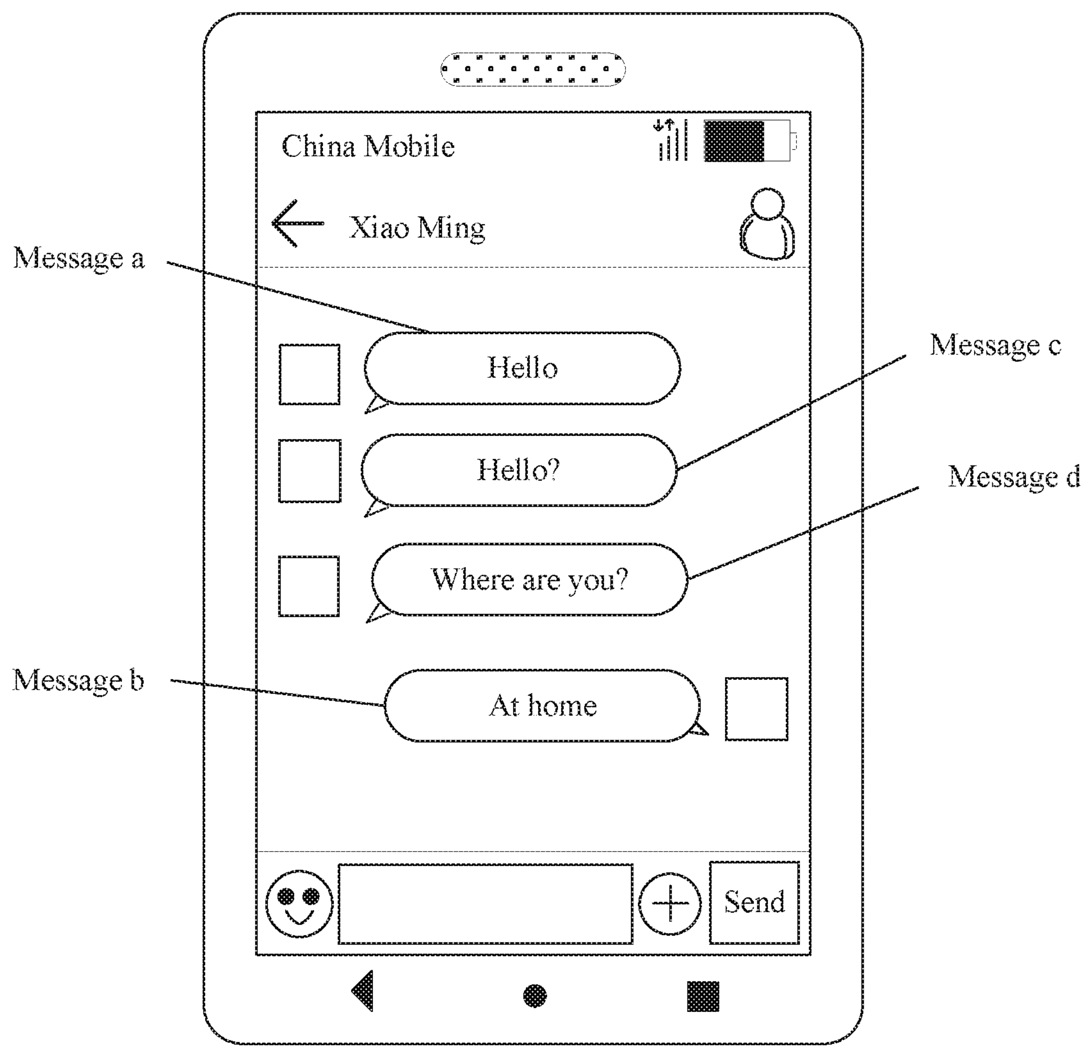
FIG. 4 is a schematic flowchart of another message record combination and display method according to an embodiment of the present invention.

Description is performed with reference to Table 3, Table 4, and FIG. 4. FIG. 4 is a schematic diagram of message content in combined message records displayed on a display of a mobile phone 1. A correct sorting result of the message content in the combined message records is as follows: message content of a message a, message content of a message c, message content of a message d, message content of a message b. For example, a local time of the mobile phone 1 is 15:50 pm, and a local time of a mobile phone 2 is 15:30 pm at the same time. If the mobile phone 1 sorts the message content of the message a, the message content of the message b, the message content of the message c, and the message content of the message d based on a display time of the message a, a display time the message b, a display time of the message c, and a display time of the message d, a processor of the mobile phone 1 arranges message content of the later sent message c (the display time of the message c is 10:05 am) and message d (the display time of the message d is 10:07 am) before the message content of the earlier sent message a (the display time of the message a is 10:20 am) because the local time of the mobile phone 1 is inconsistent with the local time of the mobile phone 2. However, in this embodiment of the present invention, a casual time of a message is not affected by a local time of a mobile phone. Therefore, after obtaining a message record of the mobile phone 1 and a message record of the mobile phone 2, the processor of the mobile phone 1 may sort the message content of the message a, the message content of the message b, the message content of the message c, and the message content of the message d based on a casual time of the message a, a casual time of the message b, a casual time of the message c, and a casual time of the message d, and arrange the message content of the later sent message c (the casual time of the message c is 9:50 am) and message d (the casual time of the message d is 9:52 am) after the message content of the earlier sent message a (the casual time of the message a is 9:20 am).

It should be noted that, in this embodiment of the present invention, description is performed by using an example of a scenario in which a terminal device combines and displays message records generated when a user performs chatting by using two terminal devices. Certainly, this embodiment of the present invention may be further applied to a scenario in Which message records generated when a user performs chatting by using three or more terminal devices are combined and displayed. A specific implementation process thereof is similar to a specific implementation process in which the terminal device combines and displays the message records generated when the user performs chatting by using the two terminal devices, Details are not described in this embodiment of the present invention.

In some embodiments, the first terminal device may further display times in combined message records. This embodiment of the present invention provides a manner of displaying a display time of a message herein.

In some embodiments, as shown in Table 3, the message record of the mobile phone 1 that is obtained by the processor of the mobile phone 1 may further include a display time of the message a and a display time of the message b. As shown in Table 4, the message record of the mobile phone 2 that is obtained by the processor of the mobile phone 1 may further include a display time of the message c and a display time of the message d. To ensure that display times in combined message records are increased in sequence, and to reduce power consumption of the mobile phone 1, the processor of the mobile phone 1 may determine, in the following manner, whether the display time of the message a, the display time of the message b, the display time of the message c, and the display time of the message d need to be displayed.

Figure 5:
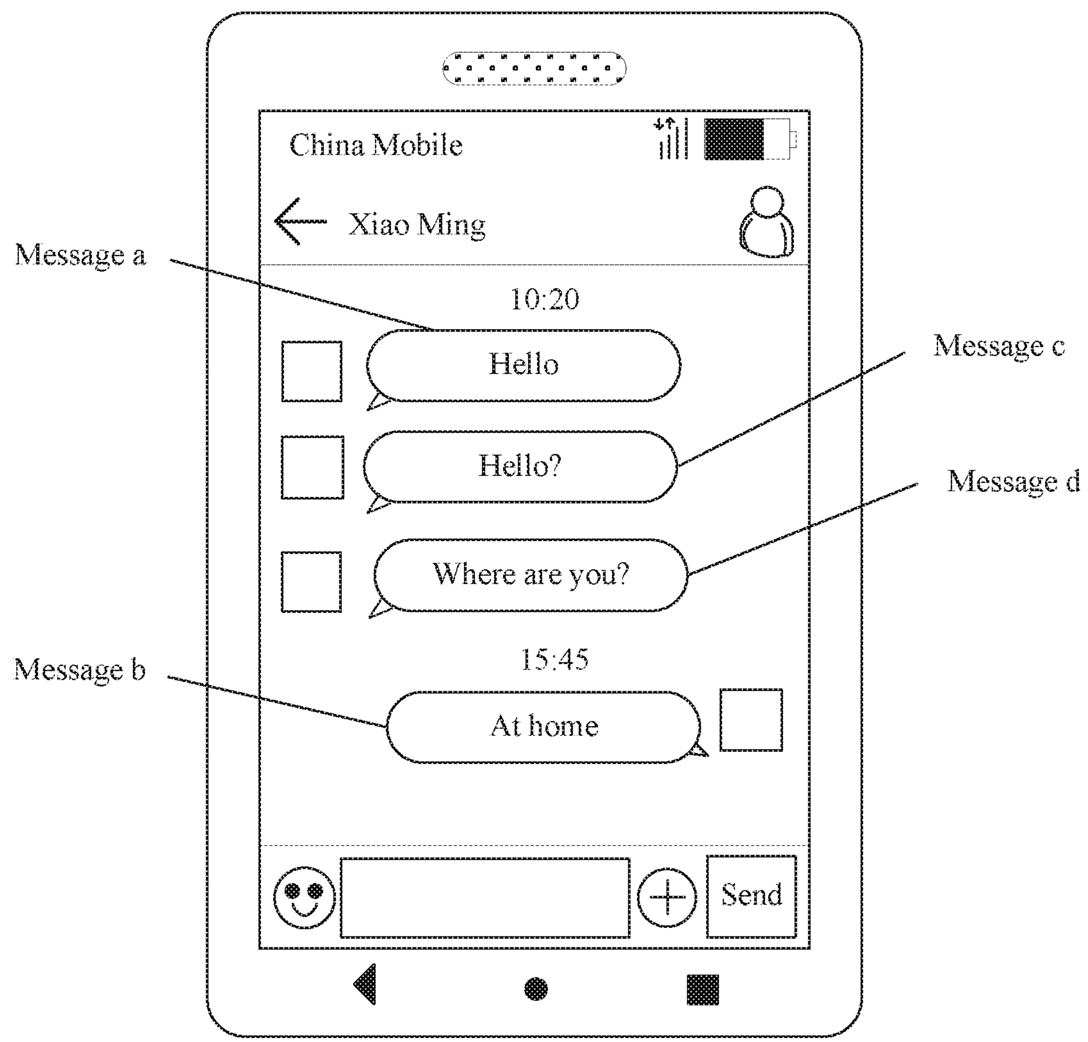
FIG. 5 is a schematic flowchart of another message record combination and display method according to an embodiment of the present invention.

Description is performed with reference to Table 3, Table 4, and FIG. 5. As shown in FIG. 5, for a message a in combined message records, because the message a is a first message obtained after a processor of a mobile phone 1 performs sorting based on casual times of messages, a display time of the message a needs to be displayed. For another message following the message a in the combined message records, a display of the mobile phone 1 may determine, by using the processor of the mobile phone 1, whether a difference between a display time of the message and the display time of the message that is displayed before the message and whose display time is displayed is greater than a preset threshold. The display time of the message is displayed only when the display of the mobile phone 1 determines that the difference is greater than the preset threshold. In this way, it is ensured that display times in the combined message records are increased in sequence, and there is no need to display a display time of each message, thereby reducing power consumption of the mobile phone 1. For example, for a message c, a message d, and a message b following the message a, an example in which the present threshold is five minutes is used for description. Because a difference between a display time of the message c (the display time of the message c is 10:05 am) and the display time of the message a (the display time of the message a is 10:20 am) is less than five minutes, the display of the mobile phone 1 does not display the display time of the message c. Because a difference between a display time of the message d (the display time of the message d is 10:07 am) and the display time of the message a is less than five minutes, the display of the mobile phone 1 does not display the display time of the message d. Because a difference between a display time of the message h (the display time of the message b is 15:45 pm) and the display time of the message a is greater than five minutes, the display of the mobile phone 1 displays the display time of the message b.

In some embodiments, a memory of the first terminal device and a memory of the second terminal device may further record a casual time, message content, and a display time of a message. In this embodiment of the present invention, an example in which the first terminal device records the casual time, the message content, and a display time of the first message is used for description.

Figure 6:
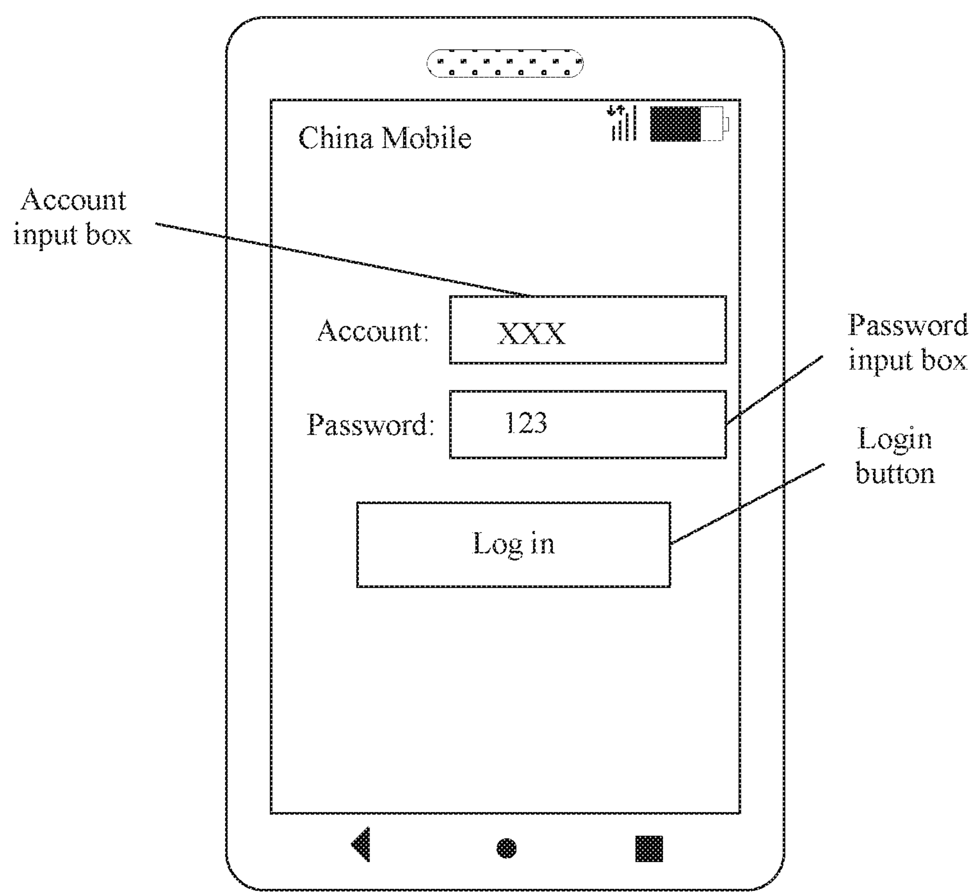
FIG. 6 is a schematic flowchart of another message record combination and display method according to an embodiment of the present invention.

The user needs to use an IM application installed on the first terminal device to perform chatting, and may enable the IM application to enter a login interface of the MI application. For example, WeChat is used as the IM application for description. The user taps an application icon of WeChat. As shown in FIG. 6, FIG. 6 is a schematic diagram of a login interface of WeChat displayed on a display of a first terminal device. The login interface includes a login account input box, a login password input box, and a login button. The user may enter an account XXX in the login account input box and enter a password 123 in the login password input box by using an input unit of the first terminal device, and tap the login button after the account and the password are entered. When detecting that a user taps the login button, a processor of the first terminal device may add the login account and the login password to a login request, and send the login request to a server by using an RF circuit of the first terminal device.

After receiving the login request sent by the RF circuit of the first terminal device, the server may check validity of the user based on the login account and the login password carried in the login request. When checking of the validity of the user succeeds, the server may send, to the RF circuit of the first terminal device, a login response used to indicate that the first terminal device successfully logs in to an IM application.

Figure 7:
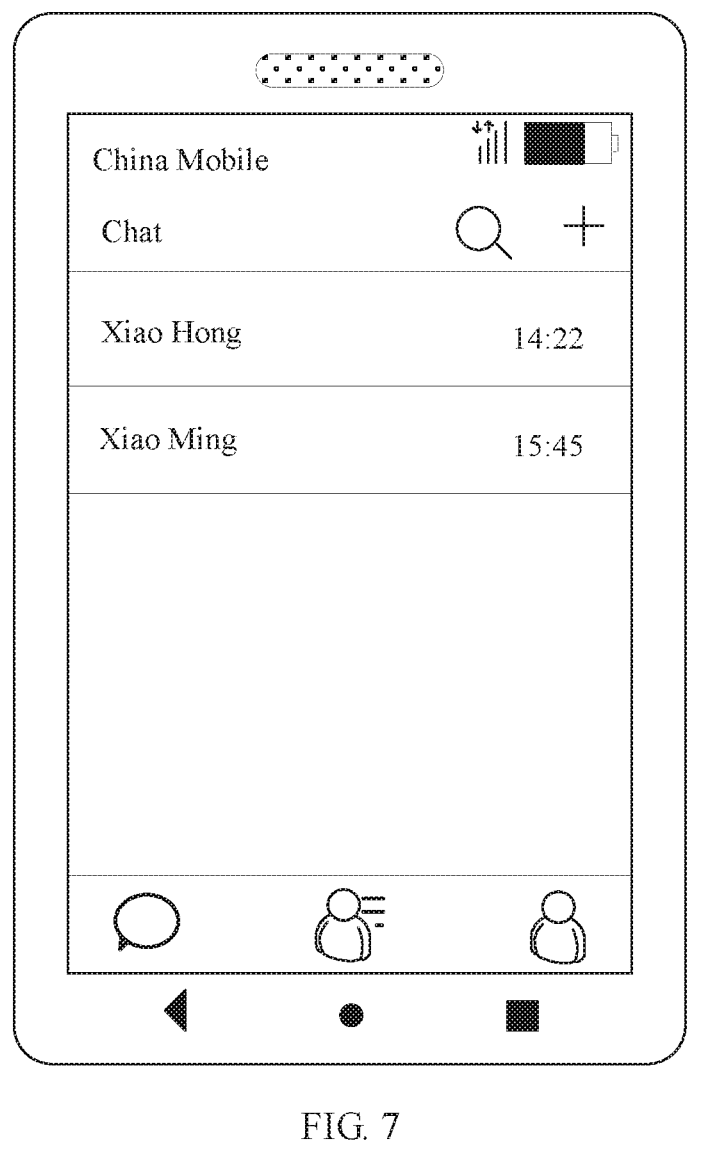

After receiving, by using the RF circuit, the login response sent by the server, the processor of the first terminal device may successfully log in to the IM application, and display a contact interface. As shown in FIG. 7, FIG. 7 is a schematic diagram of a contact interface displayed on a display of a first terminal device. At least one contact is displayed on the contact interface. For example, displayed contacts are Xiao Hong and Xiao Ming.

After the contact interface is displayed, a user may select a contact and enter a chat interface to perform chatting. When the user performs chatting, a message generated in the user chat may be transmitted between the RF circuit of the first terminal device and an RF circuit of another user terminal. For example, a first message is transmitted between the RF circuit of the first terminal device and the RF circuit of the another user terminal. The first message may be a message that needs to be sent by the RF circuit of the first terminal device, or a message received by the RF circuit of the first terminal device. When the RF circuit of the first terminal device transmits the first message, a memory of the first terminal device may record a casual time of the first message.

Figure 8:
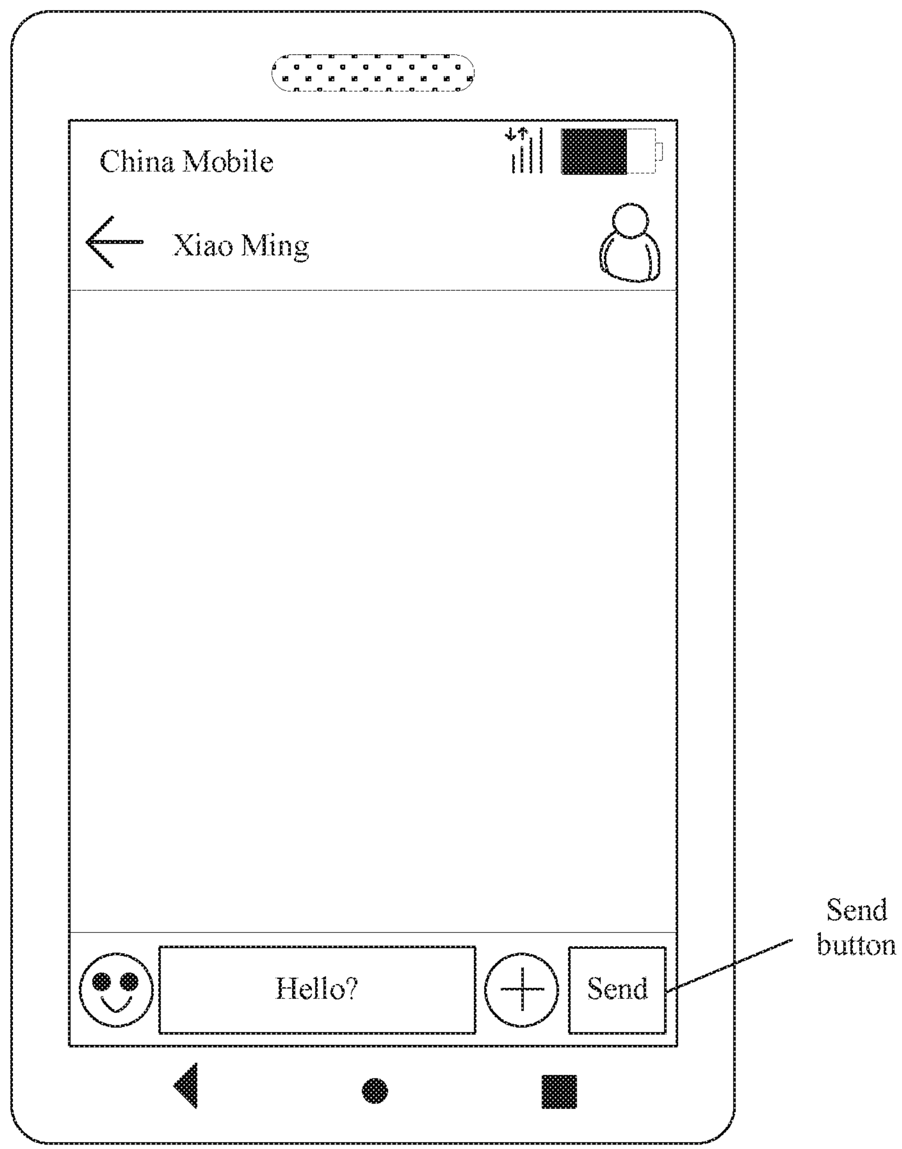
FIG. 8 is a schematic flowchart of another message record combination and display method according to an embodiment of the present invention.

In some embodiments, the first message is a message that needs to be sent by the RF circuit of the first terminal device. For example, the user chooses to send a message to Xiao Ming, and the user may open an interface of chatting with Xiao Ming. As shown in FIG. 8, FIG. 8 is a schematic diagram of an interface of chatting with Xiao Ming that is displayed on a display of a first terminal device. A message input box and a send button are displayed on the chat interface. A user may enter message content of a first message (for example, the message content of the first message is: Hello?) in the message input box by using an input unit of the first terminal device, and after the message content of the first message is entered, the user taps the send button. When detecting that the user taps the send button, a processor of the first terminal device may send the message content of the first message to a server by using an RF circuit of the first terminal device. A memory of the first terminal device may record a casual time of the first message in the following two implementations.

In a first implementation of this embodiment of the present invention, when the processor of the first terminal device detects that the user taps the send button, the memory of the first terminal device may record the casual time of the first message. The casual time of the first message is determined by the processor of the first terminal device based on an initial time, first duration, and second duration.

In some embodiments, the initial time is a coordinated universal time at which the first terminal device successfully logs in to an application. The initial time may be added to a login response by using the server, and is sent to the RF circuit of the first terminal device. The first duration is duration from a start moment of the first terminal device to the moment at which the first terminal device successfully logs in to the IM application. The start moment is a moment at which the first terminal device is powered on. For example, the first duration may be obtained when the processor of the first terminal device successfully logs in to the IM application. The second duration is duration from the start moment of the first terminal device to a moment at which the first terminal device detects that the first message needs to be sent. For example, the second duration may be obtained when the processor of the first terminal device sends the message. For example, assuming that the initial time is "initial time", the first duration is "initial second", the second duration is "now second", and the casual time of the first message is "septime", the casual time of the first message may be determined based on a formula: septime=initial time+(now second−initial second).

For example, a timer may be disposed in the first terminal device in advance, to obtain the first duration and the second duration by using the timer. The processor of the first terminal device may start the timer when detecting that the first terminal device is powered on. When successfully logging in to the IM application, the processor of the first terminal device may read timing duration of the timer. The tuning duration read at this moment is the first duration. When detecting that the first message needs to be sent, the processor of the first terminal device may read timing duration of the timer again. The timing duration read at this moment is the second duration. An example in which a timer is disposed in the first terminal device to obtain the first duration and the second duration is merely used for description herein. However, in this embodiment of the present invention, a specific implementation in which the processor of the first terminal device obtains the first duration and the second duration is not specifically limited.

It should be noted that, because the initial time is the coordinated universal time at which the first terminal device successfully logs in to the IM application, and the first duration is the duration from the moment at which the first terminal device is powered on to the moment at which the first terminal device successfully logs in to the IM application, the initial time and the first duration are unrelated to a time at which the first terminal device sends a message. Therefore, after obtaining the initial time and the first duration, the processor of the first terminal device may store the initial time and the first duration. In this way, when the RF circuit of the first terminal device sends another message, the processor of the first terminal device needs to obtain only duration from the moment at which the first terminal device is powered on to a moment at which the first terminal device detects that the another message needs to be sent, and may determine a casual time of the another message based on the stored initial time and first duration.

In a second implementation of this embodiment of the present invention, after the processor of the first terminal device sends the message content of the first message to the server by using the RF circuit of the first terminal device, the server may receive the message content of the first message, add the casual time of the first message to a response, and send the response to the RF circuit of the first terminal device. The casual time of the first message is a coordinated universal time at which the server receives the first message. The RF circuit of the first terminal device may record the casual time of the first message by using the memory of the first terminal device.

In some embodiments, the first message is a message received by using the RF circuit of the first terminal device. For example, the user receives a message from Xiao Ming. An RF circuit of a terminal device used by Xiao Ming may first send the first message to the server. The server may send the message content of the first message and the casual time of the first message to the RF circuit of the first terminal device. The casual time of the first message is a coordinated universal time at which the server sends the first message to the RF circuit of the first terminal device. The RF circuit of the first terminal device may record the casual time of the first message by using the memory of the first terminal device. For example, assuming that the coordinated universal time at which the server sends the first message to the RF circuit of the first terminal device is “server time”, and the casual time of the first message is “septime”, the first terminal device uses the received “server time” as “septime”.

When the RF circuit of the first terminal device transmits the first message, a memory of the first terminal device may further record a display time and the message content of the first message.

In some embodiments, the first message is a message sent by using the RF circuit of the first terminal device, and the display time of the first message is a local time of the first terminal device when the first terminal device determines that the first message needs to be sent. For example, assuming that the local time of the first terminal device is “local time”, and the display time of the first message is “show time”, the processor of the first terminal device uses the obtained “local time” as “show time”.

In some embodiments, the first message is a message received by using the RF circuit of the first terminal device, and the display time of the first message is obtained through calculation that is performed by the processor of the first terminal device based on the coordinated universal time at which the server sends the first message to the first terminal device and a time zone in which the first terminal device is located. For example, the display time of the first message may be a time that is determined by the processor of the first terminal device based on the coordinated universal time at which the server sends the first message to the first terminal device and a time zone difference between a local time of the first terminal device and the coordinated universal time. For example, assuming that the display time of the first message is “show time”, the coordinated universal time at which the server sends the first message to the first terminal device is “server time”, and the time zone difference between the local time of the first terminal device and the coordinated universal time is X, the processor of the first terminal device may determine the display time of the first message based on a formula: show time=server time+X.

A memory of the first terminal device records the casual time and the message content of the first message. The display of the first terminal device may display the message content of the first message based on the casual time of the first message. The display of the first terminal device may first obtain a casual time of a message before the first message by using the processor of the first terminal device, and display the message content of the first message based on the casual time of the first message and the casual time of the message before the first message. After the memory of the first terminal device records a display time of the first message, the processor of the first terminal device may first obtain a display time of the message that is displayed before the first message and whose display time is displayed. When it is determined that a difference between the display time of the first message and the display time of the message that is displayed before the first message and whose display time is displayed is greater than a preset threshold, the display of the first terminal device displays the display time of the first message.

According to the message record combination and display method provided in this embodiment of the present invention, the first terminal device sorts the message content of the first message and the message content of the second message based on the obtained casual time of the first message and the obtained casual time of the second message, and displays the message content of the first message and the message content of the second message in sequence. In this way, when message records of different terminal devices need to be combined, because a casual time of a message is a coordinated universal time at which the message is transmitted, and the coordinated universal time is not affected by a factor such as a local time of a terminal device or a time zone in which the terminal device is located, the message records combined based on casual times of messages can be correctly sorted and displayed in a message sending and receiving sequence.

In addition, the first terminal device displays a display time of a message only when determining that a difference between the display time of the message and a display time of a message that is displayed before the message and whose display time is displayed is greater than a preset threshold. In this way, not only display times in combined message records are increased in sequence, but also power consumption of the first terminal device is reduced.

To facilitate understanding by a person skilled in the art, an embodiment of the present invention describes, based on different application scenarios, the message record combination and display method provided in the embodiments of the present invention. Different scenarios and a mobile phone are used as an example for description.

Scenario 1: As shown in Table 5, a message record of a mobile phone 1 includes message content, a casual time, and a display time of a message a', message content, a casual time, and a display time of a message b', and message content, a casual time, and a display time of a message c'. The message a' and the message c' are messages sent by a user by using the mobile phone 1, and the message b' is a message received by the mobile phone 1. As shown in Table 6, a message record of a mobile phone 2 includes message content, a casual time, and a display time of a message d', and message content, a casual time, and a display time of a message e. The message d' and the message e are messages sent by a user with a same account by using the mobile phone 2.

TABLE 5

| | Message content | Casual time | Display time |
|---|---|---|---|
| Message a' | Have you eaten? | 10:45 am | 15:45 pm |
| Message b' | Yes | 11:00 am | 16:00 pm |
| Message c' | Are you working now? | 11:03 am | 16:03 pm |

TABLE 6

| | Message content | Casual time | Display time |
|---|---|---|---|
| Message d' | Hello | 10:20 am | 15:50 pm |
| Message e | What are you doing? | 10:22 am | 15:52 pm |

For example, a local time of the mobile phone 1 is 16:05 pm, and a local time of the mobile phone 2 is 16:35 pm at the same time. When the message record of the mobile phone 1 is combined into the mobile phone 2, the mobile phone 2 may display message content of the earlier sent message d' and message e before the message content of the later sent message a'. However, if the mobile phone 2 sorts and displays the message content of the message a', the message content of the message b', the message content of the message c', the message content of the message d', and the message content of the message e based on the display time of the message a', the display time of the message b', the display time of the message c', the display time of the message d', and the display time of the message e, because the local time of the mobile phone 1 is inconsistent with the local time of the mobile phone 2, the mobile phone 2 displays the message content of the earlier sent message d' (the display time of the message d' is 15:50 pm) and message e (the display time of the message e is 15:52 pm) after the message content of the later sent message a' (the display time of the message a' is 15:45 pm). In this embodiment of the present invention, a casual time of a message is not affected by a local time of a mobile phone. Therefore, when the mobile phone 2 sorts and displays the message content of the message a', the message content of the message b', the message content of the message c', the message content of the message d', and the message content of the message e based on the casual time of the message a', the casual time of the message b', the casual time of the message c', the casual time of the message d', and the casual time of the message e, a case in which the message content of the earlier sent message d' (the casual time of the message d' is 10:20 am) and message e (the casual time of the message e is 10:22 am) is displayed after the message content of the later sent message a' (the casual time of the message a' is 10:45 am) does not occur. In other words, a correct sorting result can be displayed.

Figure 9:
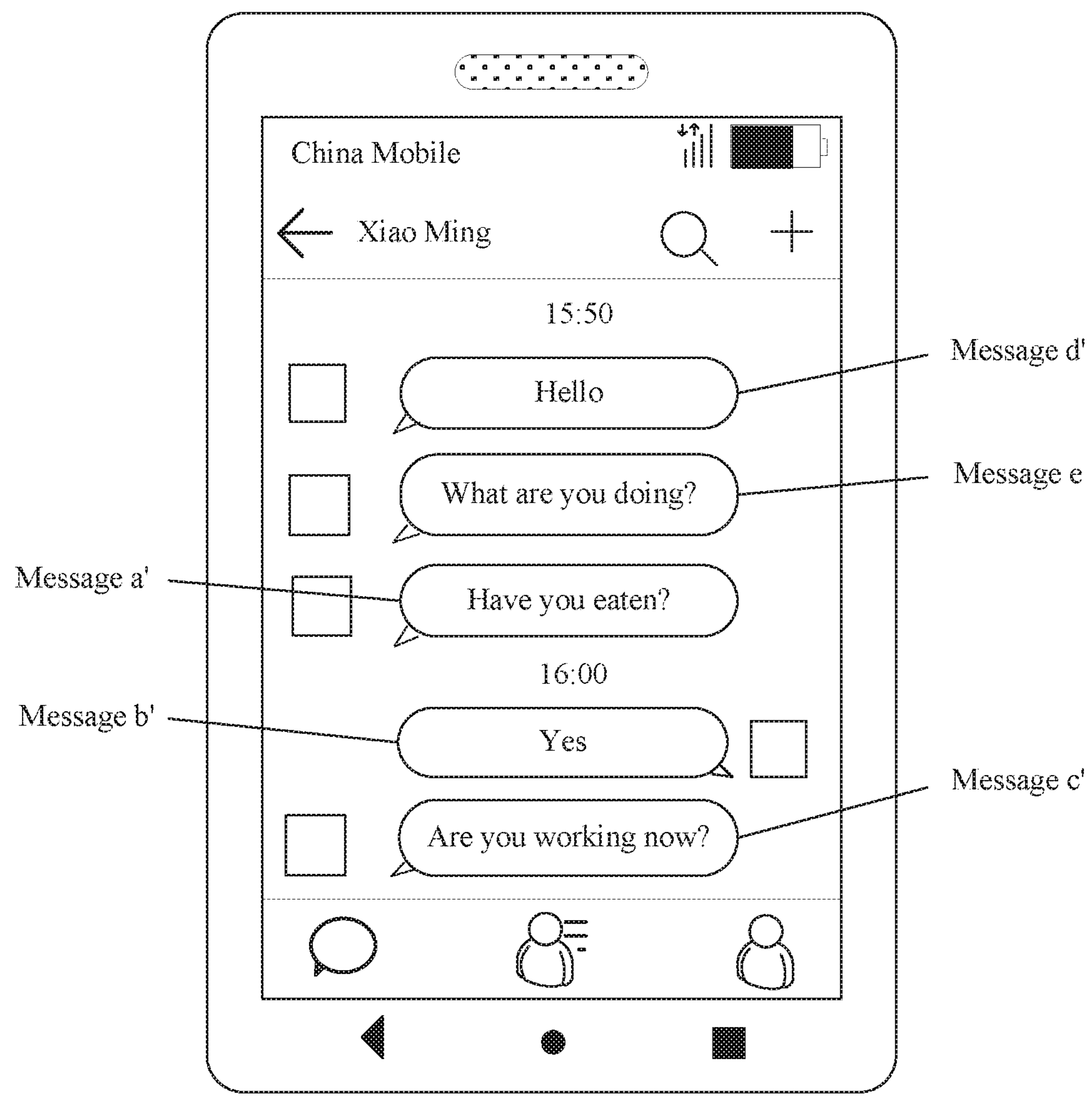
FIG. 9 is a schematic diagram of another scenario in which a message record combination and display method provided in an embodiment of the present invention is applied according to an embodiment of the present invention.

An example in which a preset threshold is five minutes is used for description. Because the message d' is a first message obtained after sorting, the mobile phone 2 displays the display time of the message d'. Because both a difference between the display time of the message e and the display time of the message d' and a difference between the display time of the message a' and the display time of the message d' are less than five minutes, the mobile phone 2 does not display the display time of the message e or the display time of the message a'. Because a difference between the display time of the message b' and the display time of the message d' is greater than five minutes, the mobile phone 2 displays the display time of the message b'. Because a difference between the display time of the message c' and the display time of the message b' is less than five minutes, the mobile phone 2 does not display the display time of the message c'. As shown in FIG. 9, FIG. 9 is a schematic diagram of an interface of combined message records displayed on a mobile phone 2.

Figure 10A:
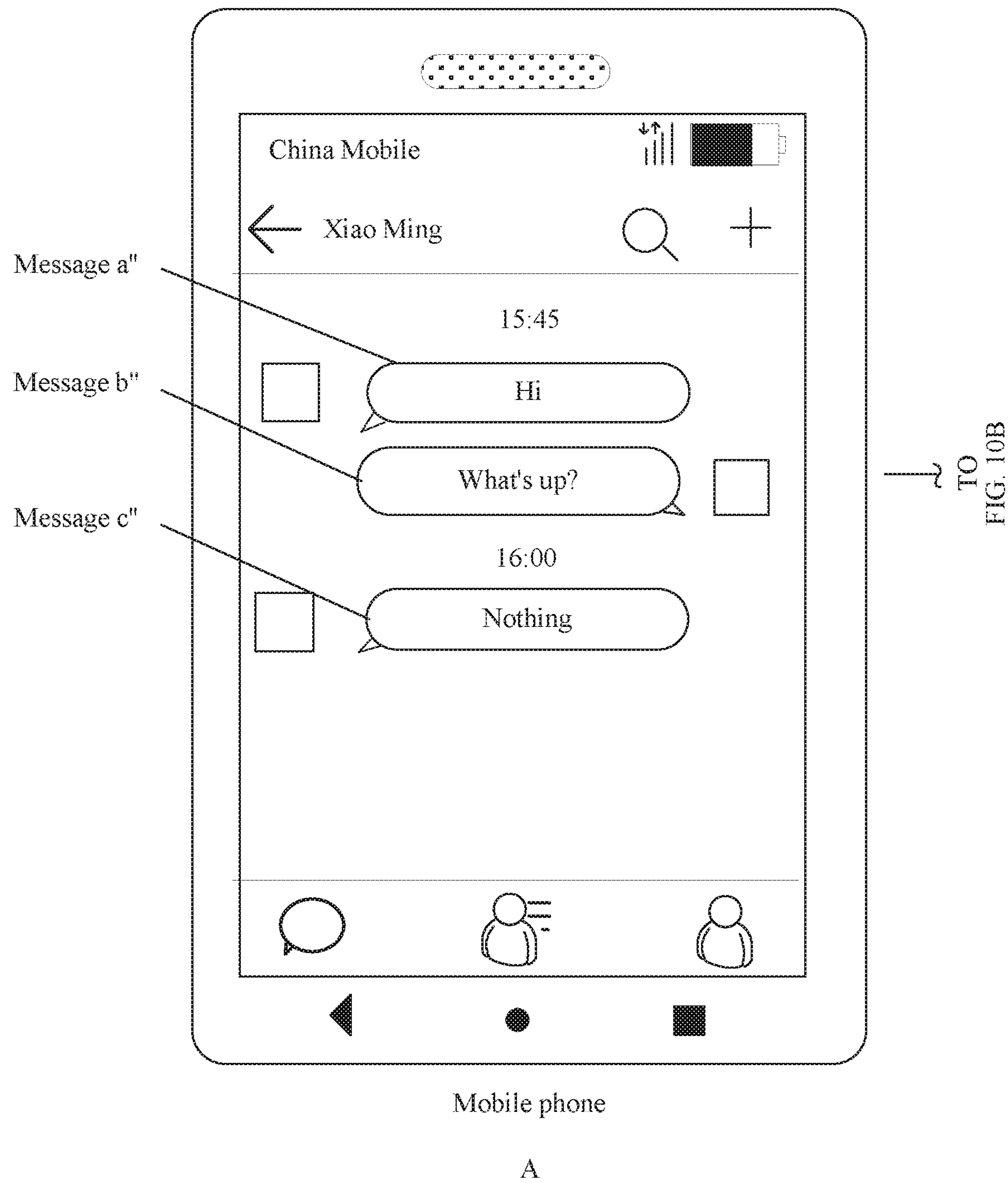
FIG. 10A and FIG. 10B are a schematic diagram of another scenario in which a message record combination and display method provided in an embodiment of the present invention is applied according to an embodiment of the present invention.

Scenario 2: As shown in FIG. 10A, FIG. 10A is a schematic diagram of a message record displayed on a mobile phone when the mobile phone is in an area 1. The message record includes a message a", a message b", and a message c". Message content of the message a" is: Hi, and a display time is 15:45 pm. Message content of the message b" is: What's wrong. Message content of the message c" is: It's ok, and a display time is 16:00 pm.

For example, a local time of the mobile phone in the area 1 is 16:05 pm on December 24, and after a user arrives in an area 2 with the mobile phone, a local time of the mobile phone in the area 2 is 10:00 am on December 24. The user logs in to an IM application on the mobile phone, and sends a message d" to another user terminal after the login succeeds. The mobile phone may determine that message content of the message d" is: What are you doing, a display time is 10:05 am on December 24, and a casual time is 13:00 pm on December 24. The mobile phone may display the message content of the later sent message d" after the message content of the earlier sent message c". However, if the mobile phone displays the message content of the message d" based on the display time of the message d", the mobile phone may display the message content of the later sent message d" before the message content of the earlier sent message a". In this embodiment of the present invention, a casual time of a message is not affected by a time zone in which the mobile phone is located. Therefore, when the mobile phone displays the message content of the message d" based on a casual time of the message c" and the casual time of the message d", if the casual time of the message c" is 11:00 am on December 24, the mobile phone displays the message content of the message d" after the message content of the message c".

Figure 10B:
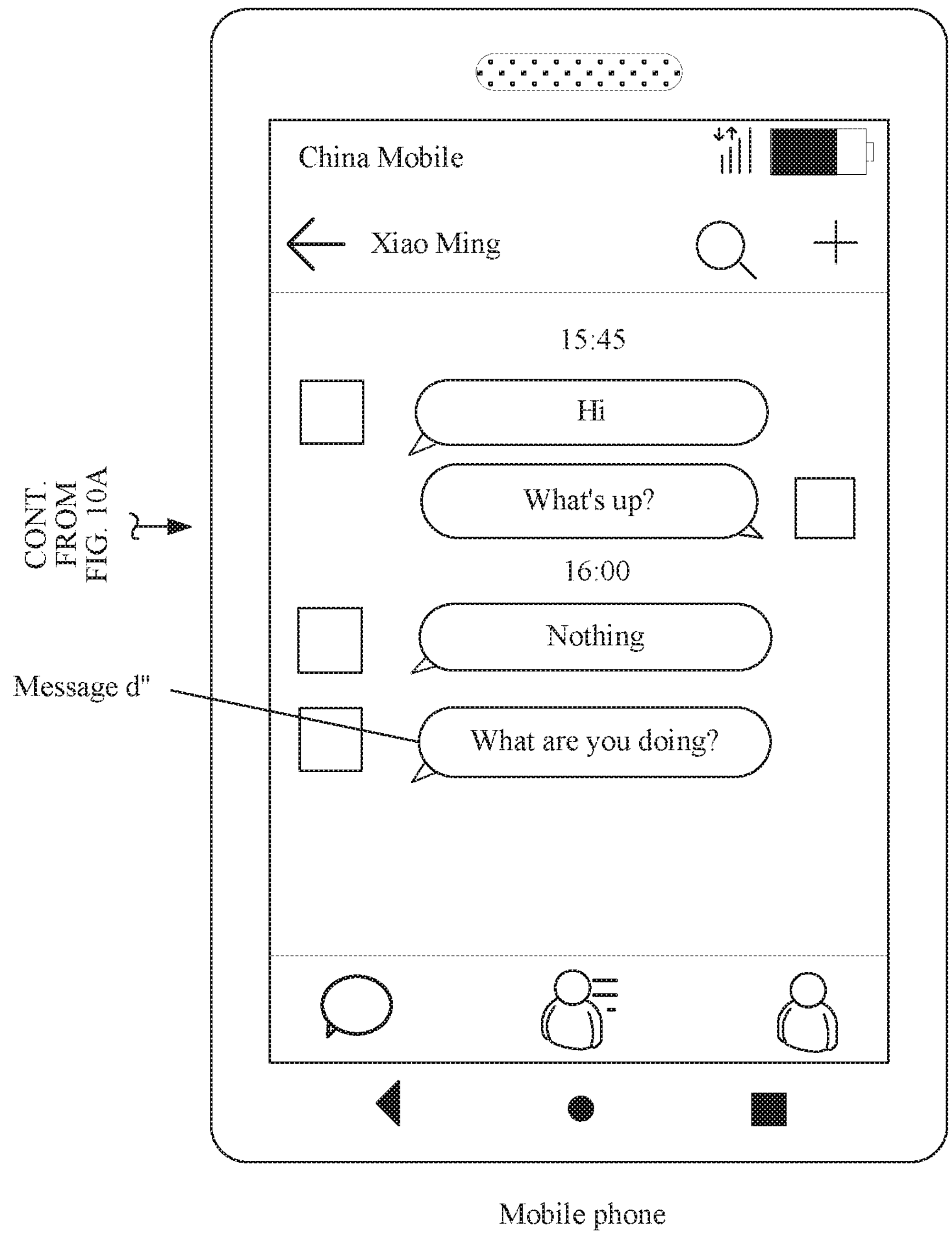

An example in which the preset threshold is five minutes is used for description. Because a difference between the display time of the message d" and the display time of the message c" is less than five minutes, the mobile phone does not display the display time of the message d". As shown in FIG. 10B, FIG. 10B is a schematic diagram of a message record displayed on a mobile phone when the mobile phone is in an area 2.

The foregoing mainly describes the solutions provided in the embodiments of the present invention from the perspective of interaction between network elements. It may be understood that, to implement the foregoing functions, each network element such as a terminal device includes a corresponding hardware structure and/or software module for performing each function. A person of ordinary skill in the art should be easily aware that the algorithm steps in the examples described with reference to the embodiments disclosed in the present invention may be implemented by hardware or a combination of hardware and computer software in the present invention. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, function module division may be performed on the terminal device based on the foregoing method examples. For example, each function module can be obtained through division based on each corresponding function, or two or more functions can be integrated into one processing module. The integrated module may be implemented in a form of hardware, or may be implemented in a form of a software function module. It should be noted that the module division in the embodiments of the present invention is an example, and is merely logical function division. There may be another division manner in an actual implementation.

Figure 11:
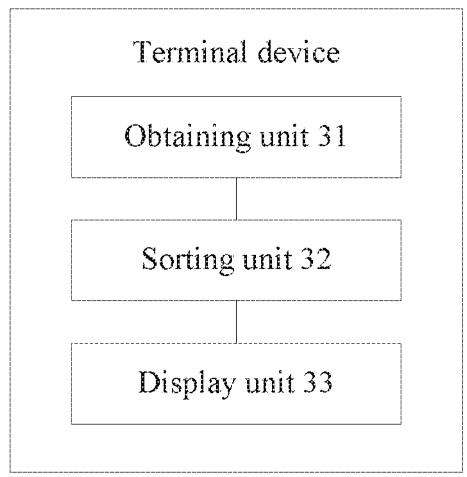
FIG. 11 is a schematic structural diagram of another terminal device according to an embodiment of the present invention.

For example, when each function module is obtained through division based on each corresponding function, FIG. 11 is a possible schematic structural diagram of a terminal device in the foregoing embodiments. The terminal device may be the first terminal device described above. As shown in FIG. 11, the terminal device may include an obtaining unit 31, a sorting unit 32, and a display unit 33.

The obtaining unit 31 is configured to: obtain a message record of the terminal device; and obtain a message record of a second terminal device, where the message record of the terminal device includes message content of a first message and a casual time of the first message, and the message record of the second terminal device includes message content of a second message and a casual time of the second message. The obtaining unit 31 is further configured to obtain a display time of a third message, where the third message is a message that is displayed before the first message and whose display time is displayed, and the display time of the third message is included in the message record of the terminal device or included in the message record of the second terminal device. The obtaining unit 31 is further configured to obtain a display time of a fourth message, where the fourth message is a message that is displayed before the second message and whose display time is displayed, and the display time of the fourth message is included in the message record of the terminal device or included in the message record of the second terminal device.

The sorting unit 32 is configured to sort the message content of the first message and the message content of the second message based on the casual time of the first message and the casual time of the second message that are obtained by the obtaining unit.

The display unit 33 is configured to display, in sequence, the message content of the first message and the message content of the second message that are sorted by the sorting unit. The display unit 33 is further configured to: when a determining unit determines that a difference between a display time of the first message and the display time of the third message is greater than a preset threshold, display the display time of the first message. The display unit 33 is further configured to: when the determining unit determines that a difference between a display time of the second message and the display time of the fourth message is greater than a preset threshold, display the display time of the second message.

Figure 12:
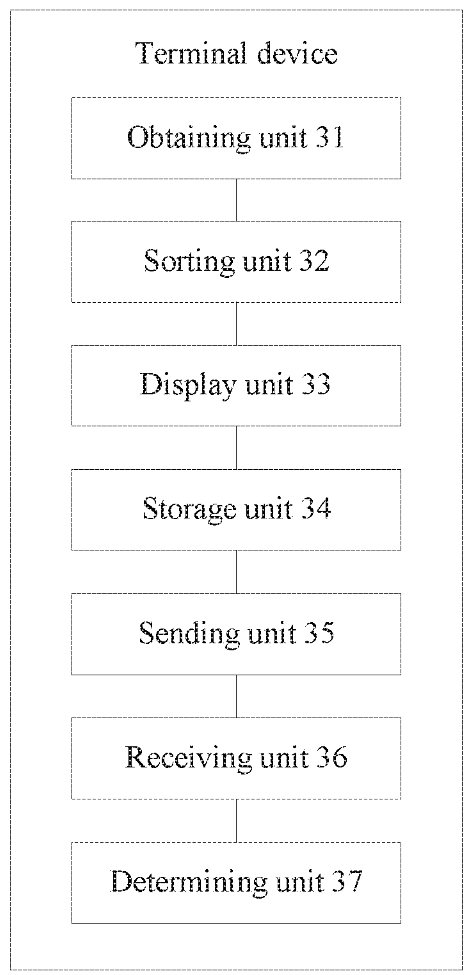
FIG. 12 is a schematic structural diagram of another terminal device according to an embodiment of the present invention.

In this embodiment of the present invention, further, as shown in FIG. 12, the terminal device may further include a storage unit 34, a sending unit 35, a receiving unit 36, and the determining unit 37.

The storage unit 34 is configured to record the casual time of the first message, where the casual time of the first message is determined based on an initial time, first duration, and second duration.

The sending unit 35 is configured to send the first message to a server.

The receiving unit 36 is configured to receive the casual time that is of the first message and that is sent by the server, where the casual time of the first message is a coordinated universal time at which the server receives the first message, or the casual time of the first message is a coordinated universal time at which the server sends the first message to the terminal device.

The determining unit 37 is configured to determine the difference between the display time of the first message and the display time that is of the third message and that is obtained by the obtaining unit. The determining unit 37 is further configured to determine the difference between the display time of the second message and the display time that is of the fourth message and that is obtained by the obtaining unit.

It should be noted that all related content of steps in the foregoing method embodiments may be cited in function descriptions of corresponding function modules. Details are not described herein.

The terminal device provided in this embodiment of the present invention is configured to perform the foregoing message record combination and display method, so that an effect same as that in the foregoing message record combination and display method can be achieved.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, to be specific, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes any medium that can store program code, such as a USB flash drive, a removable hard disk, a ROM, a RAM, a magnetic disk, or an optical disc.

The foregoing descriptions are merely specific implementations of the present invention, but are not intended to limit the protection scope of the present invention. Any variation or replacement disclosed in the present invention shall fall within the protection scope of the present invention. Therefore, the protection scope of the present invention shall be subject to the protection scope of the claims.

What is claimed is:

1. A system comprising:

a first terminal device configured to transmit a first message comprising a first message content to a server;

a second terminal device configured to:

transmit a second message comprising a second message content;

transmit a request for the first message content and the second message content;

display the first message content and the second message content in a sequence based on a first coordinated universal time (CUT) of the first message and a second CUT of the second message;

display a first display time of the first message content; and display a second display time of the second message content when a difference between the second display time and the first display time is greater than or equal to a preset threshold; wherein the server is configured to:

receive the first message from the first terminal device;

receive the second message from the second terminal device;

receive the request from the second terminal device; and transmit, to the second terminal device in response to the request, the first message content and the second message content in the sequence.

2. The system of claim 1, wherein the second display time is a local time of the second message.

3. The system of claim 1, wherein the server is further configured to determine the second display time based on the CUT of the second message and a time zone difference between a local time of the second message and the CUT of the second message.

4. The system of claim 1, wherein the server is further configured to determine the first CUT based on an initial time, a first duration, and a second duration, wherein the initial time is a CUT at which the first terminal device logs in to an instant messaging (IM) application, wherein the first duration is from a start moment at which the first terminal device is powered on to the CUT at which the first terminal logs in to the IM application, and wherein the second duration is from the start moment to a moment at which the first terminal device detects that the first message is to be transmitted.

5. The system of claim 1, wherein the server is further configured to store the first message content and the second message content in the sequence.

6. The system of claim 1, wherein the first terminal device comprises a smartwatch.

7. The system of claim 1, wherein the first terminal device comprises smartglasses.

8. A method comprising:

transmitting, by a first terminal to a server, a first message comprising first message content;

transmitting, by a second terminal to the server, a second message comprising second message content;

receiving, by the server, the first message and the second message;

requesting, by the second terminal from the server, the first message content and the second message content;

transmitting, by the server to the second terminal, the first message content and the second message content in a sequence based on a first coordinated universal time (CUT) of the first message and a second CUT of the second message;

displaying, by the second terminal, the first message content and the second message content in the sequence; and displaying, by the second terminal, a first display time of the first message content; and displaying, by the second terminal, a second display time of the second message content when a difference between the second display time and the first display time is greater than or equal to a preset threshold.

9. The method of claim 8, wherein the second display time is a local time of the second message.

10. The method of claim 8, further comprising determining, by the server, the second display time based on the CUT of the second message and a time zone difference between a local time of the second message and the CUT of the second message.

11. The method of claim 8, further comprising determining, by the server, the first CUT based on an initial time, a first duration and a second duration, wherein the initial time is a CUT at which the first terminal logs in to an instant messaging (IM) application, wherein the first duration is from a start moment at which the first terminal is powered on to the CUT at which the first terminal logs in to the IM application, and wherein the second duration is from the start moment to a moment at which the first terminal detects that the first message is to be transmitted.

12. The method of claim 8, further comprising storing, by the server, the first message content and the second message content in the sequence.

13. A server comprising:

a memory comprising instructions; and a controller coupled to the memory and configured to execute the instructions to cause the server to:

receive, from a first terminal, a first message comprising first message content;

receive, from a second terminal, a second message comprising second message content;

receive, from the second terminal, a request for the first message content and the second message content;

determine a first coordinated universal time (CUT) based on an initial time, a first duration, and a second duration, wherein the initial time is a CUT at which the first terminal logs in to an instant messaging (IM) application, wherein the first duration is from a start moment at which the first terminal is powered on to the CUT at which the first terminal logs in to the IM application, and wherein the second duration is from the start moment to a moment at which the first terminal detects that the first message is to be transmitted; and transmit, to the second terminal in response to the request, the first message content and the second message content in a sequence based on the first CUT of the first message and a second CUT of the second message.

14. The server of claim 13, wherein the server is further configured to store the first message content and the second message content in the sequence.

15. The server of claim 13, wherein the second display time is a local time of the second message.

16. The server of claim 13, wherein the second terminal is further configured to display a first display time of the first message content and a second display time of the second message content.

17. The server of claim 16, wherein the second terminal is further configured to:

display a first display time of the first message content; and display a second display time of the second message content when a difference between the second display time and the first display time is greater than or equal to a preset threshold.

18. The server of claim 13, wherein the server is further configured to determine the second display time based on the CUT of the second message and a time zone difference between a local time of the second message and the CUT of the second message.

19. The method of claim 8, wherein the first terminal comprises a smartwatch.

20. The method of claim 8, wherein the first terminal comprises smartglasses.

* * * * *